United States Patent
Wen et al.

(10) Patent No.: US 7,337,206 B1
(45) Date of Patent: Feb. 26, 2008

(54) METHOD FOR DETECTING CONGESTION IN INTERNET TRAFFIC

(75) Inventors: Han C. Wen, San Jose, CA (US); Tomas J. Pavel, San Jose, CA (US)

(73) Assignee: Network Physics, Mountain View, CA (US)

( * ) Notice: Subject to any disclaimer, the term of this patent is extended or adjusted under 35 U.S.C. 154(b) by 1230 days.

(21) Appl. No.: 10/195,904

(22) Filed: Jul. 15, 2002

(51) Int. Cl.
*G06F 15/16* (2006.01)

(52) U.S. Cl. .................. 709/200; 709/224; 370/235

(58) Field of Classification Search ............... 709/235, 709/200–202, 220–231; 370/229–238
See application file for complete search history.

(56) References Cited

U.S. PATENT DOCUMENTS

| | | | |
|---|---|---|---|
| 6,597,777 B1 * | 7/2003 | Ho | 379/133 |
| 6,735,192 B1 * | 5/2004 | Fried et al. | 370/352 |
| 6,744,757 B1 * | 6/2004 | Anandakumar et al. | 370/352 |
| 7,000,025 B1 * | 2/2006 | Wilson | 709/235 |
| 7,072,305 B1 * | 7/2006 | Gregson | 370/241 |
| 2002/0161914 A1 * | 10/2002 | Belenki | 709/235 |
| 2003/0172094 A1 * | 9/2003 | Lauria et al. | 707/206 |

OTHER PUBLICATIONS

Floyd Bullard, "A Brief Introduction to Bayesian Statistics", pp. 1-14, NCTM 2001.
Tianhang Hou, Lloyd C. Huff, and Larry Mayer, "Automatic Detection of Outliers in Multibeam Echo Sounding Data", University of New Hampshire, pp. 1-12.
Igor V. Cadez and P.S. Bradley, "Model BAsed Population Tracking and Automatic Detection of Distribution Changes" pp. 1-8.
Edwin M. Knorr and Raymond T. Ng, "A Unified Approach for Mining Outliers", Universityof British Columbia, pp. 1-13.
Mark Last and Abraham Kandel, Automated Detection of Outliers in Real-World Data, pp. 1-10.
Dantong Yu, Gholam Sheikholeslami and Aidong Zhang, "Find Out: Finding Outliers in Very Large Datasets", University of New York at Buffalo, pp. 1-19.
Hiroyuki Ohsaki, Mitsushige Morita and Masayuki Murata, "Measurement-Based Modeling of Internet Round-Trip Time Dynamics using System Identification", pp. 1-20.
Polly Huang, Anja Feldmann and Walter Willinger, "A non-intrusive, wavelet-based approach to detecting network performance problems", pp. 1-15.
Matthew Mathis, Jeffrey Semke and Jamshid Mahdavi, "The Macroscopic Behavior of the TCP Congestion Avoidance Algorithm", ACM SIGCOMM, vol. 27, No. 3, (Jul. 1997), pp. 1-16.

(Continued)

*Primary Examiner*—Moustafa M. Meky
(74) *Attorney, Agent, or Firm*—Blakely, Sokoloff, Taylor & Zafman LLP

(57) ABSTRACT

A baseline for internet traffic duration is established by (i) collecting internet traffic data regarding file size, server response time, packet loss and round trip time, (ii) removing from this data outliers associated with file size, server response time and packet loss per client type, and (iii) organizing any remaining data into round trip time bins according to median values of round trip time per client type. Thereafter, historical or newly collected Internet traffic data is compared against threshold values for each round trip time bin to locate duration outliers. These duration outliers are indicators of congestion and congestion episodes may be identified by the continued presence of such outliers over successive time intervals.

21 Claims, 6 Drawing Sheets

OTHER PUBLICATIONS

Nevil Brownlee and Chris Loosley, "Fundamentals of Internet Measurement: A Tutorial" Keynote, (May 1, 2001) pp. 1-14.

M. Mathis and M. Allman, RFC 3148 "A Framework for Defining Empirical Bulk Transfer Capcity Metrics", Internet Society (Jul. 2001), pp. 1-16.

G. Almes, S. Kalidindi and M. Zekauskas, RFC 2681 "A Round-Trip Delay Metric for IPPM", Internet Society (Sep. 1999), pp. 1-20.

G. Almes, S. Kalidindi and M. Zekauskas, RFC 2680 "A One-Way Packet Loss Metric for IPPM", Internet Society (Sep. 1999), pp. 1-15.

G. Almes, S. Kalidindi and M. Zekauskas, RFC 2679 "A One-Way Delay Metric for IPPM", Internet Society (Sep. 1999), pp. 1-20.

J. Mahdavi and V. Paxson, RFC 2498 "IPPM Metrics for Measuring Connectivity", Internet Society, (Sep. 1999), pp. 1-10.

V. Paxson et al., RFC 2330 "Framework for IP Performance Metrics" Internet Society, (May 1998), pp. 1-40.

Vern Paxson, "End-to-End Routing Behavior in the Internet", University of California, (May 23, 1996), pp. 1-23.

"Handbook for Statistical Analysis of Environment Background Data", Naval Facilities Engineering Command, (Jul. 1999), pp. 1-83.

Surendra P. Verma, "Sixteen Statistical Tests for Outlier Detection and Rejection in Evaluation of International Geochemical Reference Materials: Example of Microgabbro PM-S", Geostandards Newsletter, vol. 21 No. 1, (Jun. 1997) pp. 59-75.

Kenneth C. Glossbrenner, Approved Text for new Recommendation I.380: "Internet Protocol Data Communication Service—IP Packet Transfer and Availability Performance Parameters", (May 3, 1999), pp. 1-28.

V. Raisanen, G. Grotefeld & A. Morton, draft-ietf-ippm-npmps-07 "Network Performance measurement With Periodic Streams", Internet Society, pp. 1-31.

Rajeev Koodli & R. Raukanth draft-ieft-ippm-loss-pattern-07, "One-Way Loss Pattern Sample Metrics", Internet Society IPPM Working Group, (Mar. 28, 2002), pp. 1-23.

C. Demichelis & P. Chimento draft-ietf-ippm-ipdv-09, "IP Packet Delay Variation Metric for IPPM", Internet Society Network Working Group, (Apr. 2002), pp. 1-31.

Vern Paxson and Sally Floyd, "Why We Don't Know How to Simulate the Internet", University of California, (Dec. 1997), pp. 1-8.

Edwin M. Knorr and Raymond T. Ng, "Algorithms for Mining Distance-Based Outliers in Large Datasets", University of British Columbia, (1998), pp. 1-12.

Vern Paxson, PH.D. Thesis "Measurements and Analysis of End-to-End Internet Dynamics", Comp7ter Science Division, University of California, Berkeley and Information and Computing Sciences Division Lawrence Berkeley National Laboratory University of California, Berkeley, CA 94720, Apr. 1997, Abstract, Table of Contents, Chapter 9 "Overview of the Packet Dynamics Study", pp. 102-124 (43 pages total).

J. Mahdavi and V. Paxson, "IPPM Metrics for Measuring Connectivity," RFC 2678, Internet Society, pp. 1-10 (Sep. 1999).

\* cited by examiner

Web Page 16 with
Multple Objects

METHOD FOR DETECTING CONGESTION IN INTERNET TRAFFIC

FIELD OF THE INVENTION

The present invention relates to a method for detecting congestion in computer network traffic, and in particular to such a method that relies on the identification of outliers in datasets having associated parameters meaningful to such determinations.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no control is exercised, as the load increases, use increases for a while. Then, as the queue lengths at various nodes begin to grow, throughput actually drops. This is due, in part, to the retransmission of dropped packets, and it is common for this condition to be described as "congestion". It is clear that catastrophic network failures due to congestion should (indeed, must) be avoided and preventing such failures is the task of congestion control processes within packet switched networks. As a starting point for such processes, however, one must be able to determine when and where congestion is occurring.

Any attempt to measure congestion (which for purposes of this discussion shall be regarded more formally as anomalous deviations in the end-to-end response time or duration of a connection) necessarily requires the gathering of some network performance information. This raw information may relate to a variety of network "metrics" as defined by the Internet Engineering Task Force (IETF) in a series of Requests for Comments (RFCs) as follows:

a. RFC 2330, entitled "Framework for IP Performance Metrics" (May 1998), define a general framework for particular metrics to be developed by the IETF's IP Performance Metrics effort, begun by the Benchmarking Methodology Working Group (BMWG) of the Operational Requirements Area, and being continued by the IP Performance Metrics Working Group (IPPM) of the Transport Area.

b. RFC 2678, entitled "IPPM Metrics for Measuring Connectivity" (September 1999), defines a series of metrics for connectivity between a pair of Internet hosts. It builds on notions introduced and discussed in RFC 2330, the IPPM framework document.

c. RFC 2679, entitled A One-way Delay Metric for IPPM" (September 1999), defines a metric for one-way delay of packets across Internet paths.

d. RFC 2680, entitled "A One-way Packet Loss Metric for IPPM" (September 1999), defines a metric for one-way packet loss across Internet paths.

e. RFC 2681, entitled "A Round-trip Delay Metric for IPPM" (September 1999), defines a metric for round-trip delay of packets across Internet paths.

f. A draft RFC entitled "IP Packet Delay Variation Metric for IPPM" (April 2002) refers to a metric for variation in delay of packets across Internet paths. The metric is based on the difference in the One-Way-Delay of selected packets. This difference in delay is called "IP Packet Delay Variation".

g. A draft RFC entitled "One-Way Loss Pattern Sample Metrics" (March 2002) uses the base loss metric defined in RFC 2680 to define two derived metrics, "loss distance" and "loss period", and the associated statistics that together capture loss patterns experienced by packet streams on the Internet. The authors postulate that the loss pattern or loss distribution is a key parameter that determines the performance observed by the users for certain real-time applications such as packet voice and video. For the same loss rate, two different loss distributions could potentially produce widely different perceptions of performance.

h. A draft RFC entitled "Network Performance Measurement with Periodic Streams" (April 2002) describes a periodic sampling method and relevant metrics for assessing the performance of IP networks.

Regardless of the metric of interest, the volume of information obtained generally requires that it be analyzed using statistical tools in order to arrive at conclusions about the network's performance. One problem with relying on statistical measures of network performance parameters, however, is that such data can be highly influenced by so-called outliers. Outliers are generally regarded as observations that deviate so much from other observations of the same dataset as to arouse suspicions that they were generated by a different mechanism. See, e.g., Edwin M. Knorr and Raymond T. Ng., "Algorithms for Mining Distance-Based Outliers in Large Datasets", Proc. $24^{th}$ VLDB Conf. (New York 1998). Thus, it is often necessary to eliminate such outliers from the dataset before subjecting the remaining data to analysis.

Most statistical tests that have been developed to identify outliers for a given variable are constrained to data for that variable. For example, in the case of duration outliers for Internet traffic, conventional statistical tests are performed using only a time series of such durations. This inherently limits the accuracy of determining a baseline from which an outlier is defined relative to. Examples of such statistical tests include Grubb's Test, Rosner's Test and Walsh's Test, all of which are too conservative when applied to Internet traffic data. That is, these tests fail to recognize outliers that one can qualitatively identify. However, if these duration outliers could be eliminated by independent measurements, then the remaining data could then be used to accurately establish a baseline. This baseline then defines the limit of what is considered a non-outlier. Indeed, this is what the present inventors have done.

SUMMARY OF THE INVENTION

Congestion in Internet traffic is detected on the basis of duration outliers, where the average duration over a given time interval exceeds a threshold value. To decide whether or not a duration outlier exists, a baseline for internet traffic duration is established by (i) collecting internet traffic data regarding file size, server response time, packet loss and round trip time, (ii) removing from this data outliers associated with file size, server response time and packet loss per client type, and (iii) organizing any remaining data into round trip time bins according to median values of round trip time per client type. Thereafter, newly collected Internet traffic data is compared against threshold duration values for each round trip time bin to locate any duration outliers.

BRIEF DESCRIPTION OF THE DRAWINGS

The present invention is illustrated by way of example, and not limitation, in the figures of the accompanying drawings in which.

DETAILED DESCRIPTION

Described below is a method for detecting congestion in Internet traffic. Congestion in this context is defined as anomalous deviations in the end-to-end response time or duration of a connection. We will refer to these anomalies as duration outliers, for which the average duration over a given time interval exceeds a threshold value. When one or more contiguous time intervals are each characterized by duration outliers, then the total interval time will be referred to as a congestion episode.

In the following description, examples of various threshold values that may be used in determining which data values are outliers and which are not are set forth. These examples, however, are not meant to be restrictive. Instead, they are provided so that the reader may have some context with which to associate the discussion of such thresholds. In practice, the actual value of these thresholds may vary, and such variations are within the contemplated scope of the present invention. Likewise, the present inventors anticipate the use of so-called independent variables other than those discussed below. Thus, the true measure of the present invention should not be restricted to the examples set forth below, but rather should be consistent with the scope of the claims which follow that discussion.

Figure 1:
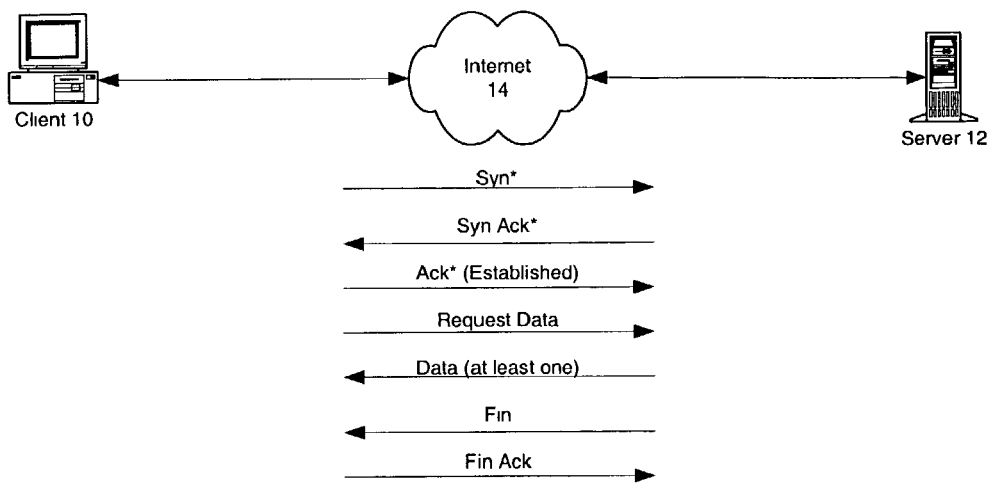
FIG. 1 illustrates an example of an Internet connection between a client and a server.
Figure 1:
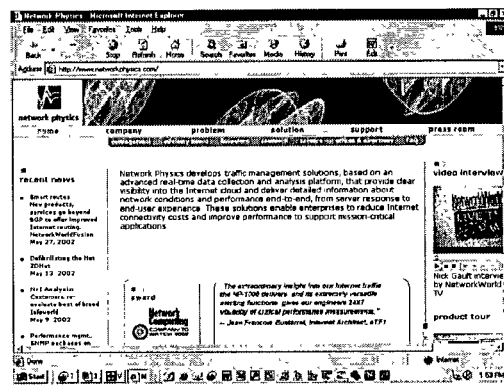

Before discussing the present invention in detail, some background regarding Internet connections and the like is useful. FIG. 1 shows a typical interaction between a client 10 and a server 12 across the Internet 14. In this case, the client 10 is a Web browser application that executes on a personal computer. When a client 10 such as a Web browser requests content (i.e., data resident on the server 12), dozens of round trips must take place between the client 10 and the distant server 12. This is because a Web page 16 is typically composed of dozens of objects; for each object there must first be a connection set up between the client 10 and the server 12, followed by the delivery of the actual object content. The TCP protocol coupled with the limit in packet size forces the object content to be delivered typically in several round trips.

At this point it is useful to recognize that a so-called "Web page" 16 really is not a "page" in the traditional sense of a page in a book. Nor is it even really a "document". Instead, a Web page 16 is a set of computer instructions (usually written in the hypertext markup language or HTML) containing a list of embedded object references. The computer instructions tell the client 10 how to retrieve, organize and, if appropriate, display the objects on the screen of the personal computer. The objects may be files, images, applets (small computer programs), or any other resource and are usually referenced by a uniform resource identifier (URI), which acts as a unique address for the object.

As shown in the illustration, the process of downloading each of these objects in order to properly display the Web page 16 requires that the client 10 exchange a number of "handshakes" with the server 12 in order to establish the connection. Only once a connection has been established can the object be downloaded. Afterwards, the connection is terminated and the process repeats for another object until all of the objects referenced in the Web page 16 have been downloaded to the client 10. Typical Web browsers can open up to four concurrent connections with a server so that four separate objects may be concurrently downloaded. Nevertheless, multiple round trips between client 10 and Web server 12 are often necessary for the opening and closing of connections to retrieve a single Web page 16. This illustration describes the behavior of the HTTP protocol, version 1.0.

In determining whether or not congestion exists in a network (be it the Internet or another network) we consider the "duration" of a connection. In this context, we will define the duration as the total end-to-end response time of a connection (e.g., the duration is the total connection time of an object: time from receiving the client handshake packet to the time of receiving the acknowledgement of the server FIN packet). Thus, this duration includes such variables as server response time in addition to the actual time required for the object to successfully transit the Internet. Duration is a useful measure of how congestion affects the end-user's experience.

As discussed further below, congestion will be deemed to exist if duration outliers are observed in a study of a duration time series. That is, the present method seeks to collect data regarding connection durations and then analyze that data for outliers to identify congestion in the network under study. Congestion episodes will be said to exist where one or more contiguous time intervals that are each characterized by duration outliers are present.

Duration data can be gathered in a variety of ways. For example, when installed in a network the NP-1000 Internet Traffic Manager™ produced by Network Physics, Inc. of Mountain View, Calif., the assignee of the present invention, is capable of monitoring and recording a wide range of network metrics, which can be displayed via tables, charts, and topological diagrams for all traffic through the NP-1000, or for user-specified groups of servers, autonomous systems, or clients. The data can be resolved to various granularities for various time periods. Some of the network metrics monitored by the NP-1000 are referred to as independent variable data discussed below.

Thus, once duration data (e.g., for one or a group of specified clients, routes, servers, networks, or any other category of choice) has been collected, it can be analyzed to determine if congestion episodes are present. As indicated above, this determination is made by looking for outliers in the duration data. Durations that exceed established norms are categorized as outliers and the associated clients, routes, etc. are identified as experiencing congestion.

Establishing the norms for this determination is not, however, a straightforward matter. As discussed above, most statistical tests that have been developed to identify outliers for a given variable give results that are too conservative when applied to Internet traffic data because the tests are constrained to data for that variable. For example, in the case of identifying duration outliers, conventional statistical tests to identify outliers would be performed using only the time series of durations. This inherently limits the accuracy of determining a baseline, from which an outlier is defined relative to.

Instead of relying on these conventional tests, the present method involves exploiting additional information, not available in the standard statistical tests, in the form of independent variables. These independent variables are known to affect duration. Before making any determination about duration outliers, the same Internet traffic that was studied for the collection of duration time series is studied for the independent variable information. Outliers from each independent variable are then systematically removed. The data pool that remains represents a more accurate representation of the baseline distribution of durations, from which a threshold value that defines an outlier can be rigorously defined.

Although in some cases using a single independent variable may be sufficient, for the case of Internet traffic there are four independent variables that have been identified as affecting duration: the connection payload or file size; the server response time (time from the client's request and the first data packet from the server); the packet loss (fraction of retransmitted packets or bytes); and latency (average file round-trip time (RTT)). These metrics are averaged in the same manner as duration over each time interval.

To eliminate data points associated with outliers in file size or server response time; threshold values are defined (e.g., as the $95^{th}$ percentile) for each metric. Note that all of the threshold values are determined from distributions accumulated over all client data under consideration for outlier detection. This aggregation suppresses any individual client from skewing the true duration baseline. For example, the data set may be sorted according to file size measurements by increasing value. If there are N measurements, take the 0.95*Nth value from this sorted list. This value represents the $95^{th}$ percentile for file size. A similar procedure may be used for server response times.

For file size distributions that do not have well-defined means (e.g., bi-modal or strongly heavy-tailed), outliers cannot be readily identified by the aggregate distribution. Instead, the traffic should be categorized into distinct file size ranges. The remaining steps in the procedure described below should then be applied independently to each file size range.

With packet loss outliers the procedure is complicated by the realization that different clients have in general, different baseline packet loss distributions. Based on empirical analysis of various RTT distributions, there are two broad groups of clients that have distinct baseline packet loss distributions: clients with low or high RTTs as indicated by whether the median file RTT for a given client is below or above 300 ms. Thus, if the median less than 300 ms, then the client is categorized as low RTT, otherwise the client is categorized as high RTT. Once the data is partitioned into these two groups (high RTT, low RTT), the threshold values for packet loss are defined as the $95^{th}$ percentile of packet loss for each group. While this represents one way of characterizing clients, the categorization of clients into a more general set such as several ranges in median file RTT may be more appropriate if the types of clients vary more widely. The baseline distribution and associated threshold value would then be determined for each client group.

These threshold values for file size, server response time and packet loss are then applied to the data to eliminate respective outliers. The remaining data is ready for the final outlier elimination: anomalous RTT. This time the procedure is even more complicated due to the difficulty in discriminating between latency due to either propagation delay or bandwidth bottlenecks, and excess queuing delay. To mitigate this problem, the data is partitioned into bins of RTT based on the median RTT of the client, for example: (0, 300 ms], (300,400 ms], (400,1000 ms], (>1 sec). The final threshold values, this time for duration, are then defined as the $95^{th}$ percentile of duration for each RTT partition.

Figure 2:
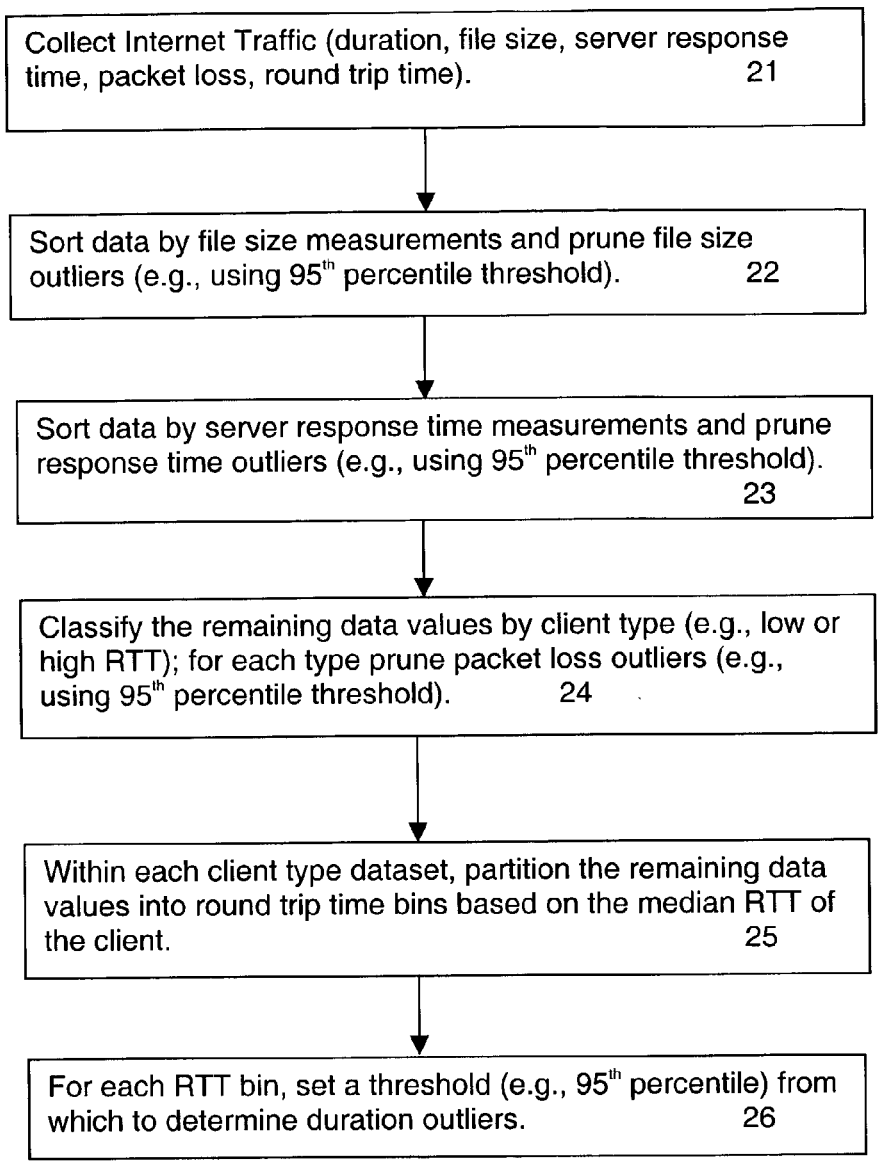
FIG. 2 illustrates an example of a process for determining duration baselines against which decisions regarding duration outliers can be made in accordance with the present invention.

FIG. 2 illustrates the steps in a procedure 20 for establishing a duration baseline and detecting duration outliers as discussed above. Initially at block 21, Internet traffic data is collected. This data is not limited to duration, but instead includes the independent variable data; file size, server response time, packet loss and RTT. Once the data is collected, the process of establishing the duration baseline can begin.

Figure 3:
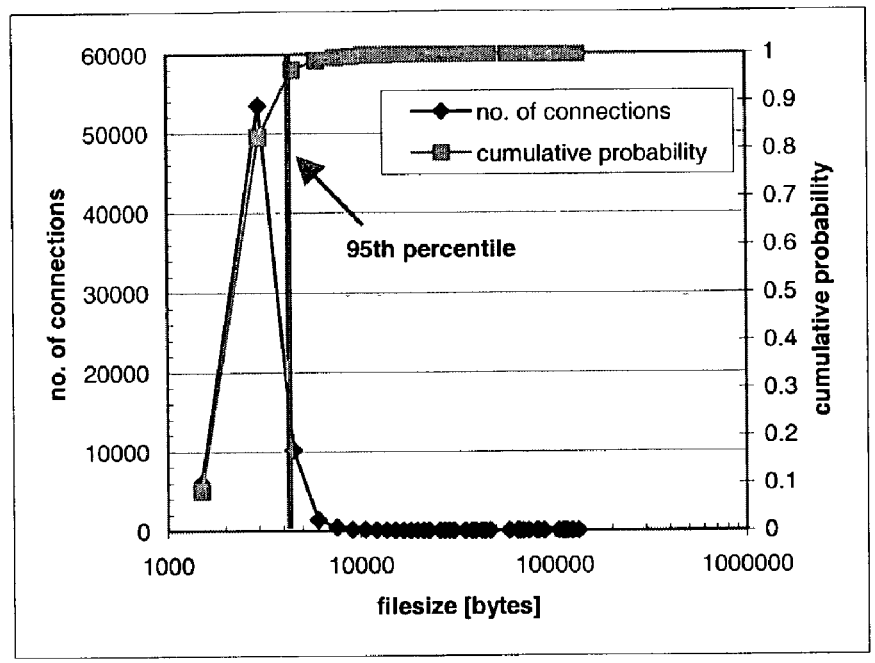
FIG. 3 is a plot illustrating an example of defining a threshold value for file size for collected Internet data as part of a process for identifying duration outliers in accordance with an embodiment of the present invention.

In this example, establishing that baseline begins with organizing the dataset according to increasing values of files size (see block 22). Note that server response time pruning could be done first in another embodiment. Outliers are removed from the dataset by setting a file size threshold (e.g., at the $95^{th}$ percentile or other selected point) and removing from consideration all those data points that have associated file sizes in excess of that threshold. FIG. 3 illustrates an example of setting a threshold for file size data at the $95^{th}$ percentile thereof. Those data points that exceed this threshold may be eliminated.

Figure 4:
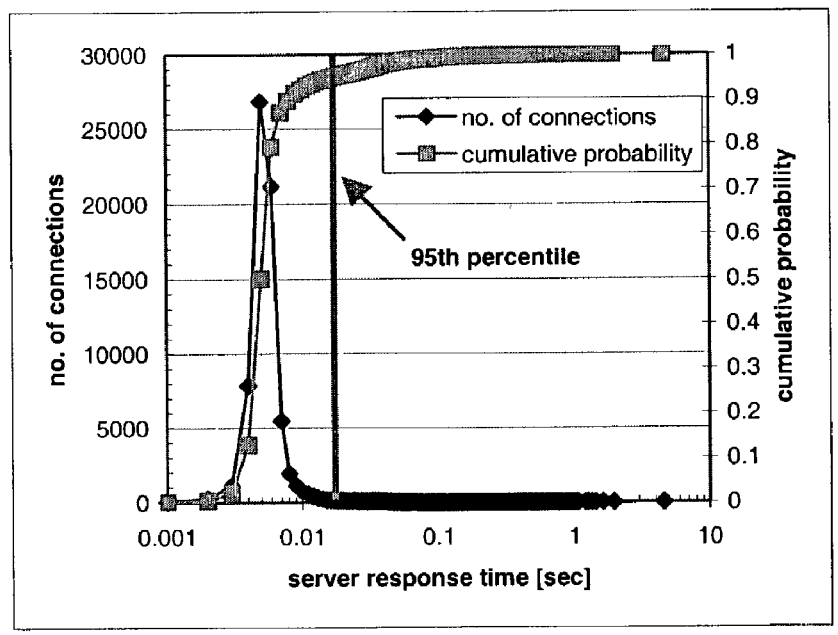
FIG. 4 is a plot illustrating an example of defining a threshold value for server response time for collected Internet data as part of a process for identifying duration outliers in accordance with an embodiment of the present invention.

Next, the remaining data points are sorted by ascending server response time (see block 23). Again, outliers (this time as measured by the server response time criteria) are removed by setting a threshold (e.g., at the $95^{th}$ percentile or other selected point of server response times) and removing from consideration all those data points that have associated server response times in excess of that threshold. FIG. 4 illustrates an example of setting a threshold for server response time data at the 95th percentile thereof. Those data points that exceed this threshold may be eliminated.

Figure 5:
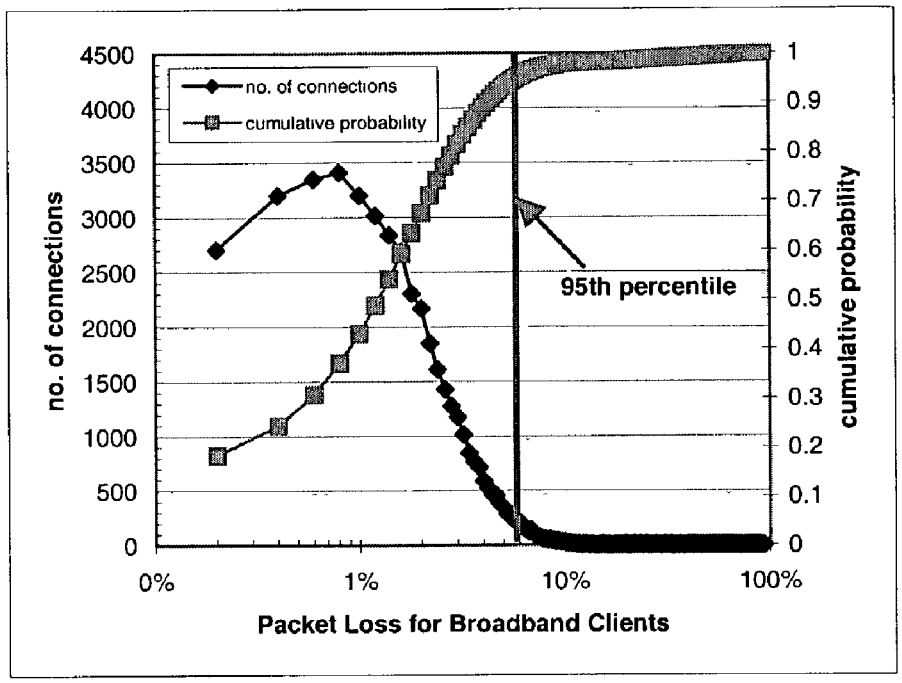
FIG. 5 is a plot illustrating an example of defining a threshold value for packet loss for low round-trip time (RTT) clients for collected Internet data as part of a process for identifying duration outliers in accordance with an embodiment of the present invention.
Figure 6:
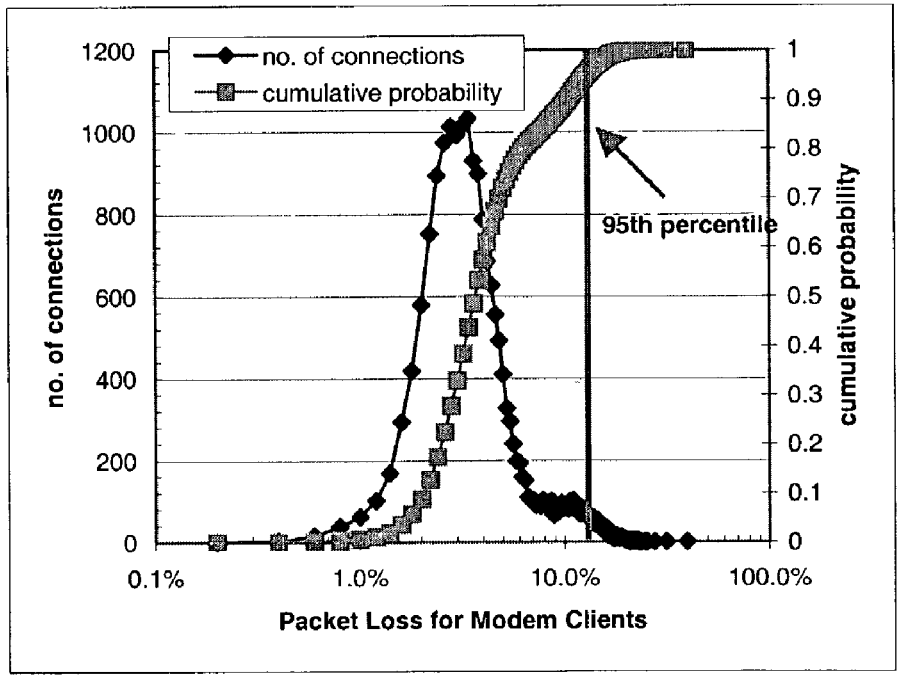
FIG. 6 is a plot illustrating an example of defining a threshold value for packet loss for high RTT clients for collected Internet data as part of a process for identifying duration outliers in accordance with an embodiment of the present invention.

Now, the procedure changes slightly in that instead of subjecting the entire dataset to a single thresholding operation based on packet loss information, the dataset is divided into different groups. In this case, the groups are segregated based on the type of client involved in the connection. High RTT clients (empirically determined for example, as those clients with a median RTT of 300 ms or more) are collected in one group and low RTT clients (those with a median RTT of less than 300 ms) are collected in another group. Within each group, the data points are sorted by ascending packet loss values and outliers are removed by setting a threshold (e.g., at the 95th percentile or other selected point of packet losses) and removing from consideration all those data points that have associated packet loss in excess of that threshold (see block 24). FIGS. 5 and 6 illustrate examples of setting thresholds for packet loss for low and high RTT clients, respectively, at the 95th percentile thereof. Those data points that exceed the respective thresholds may be eliminated.

Figure 7:
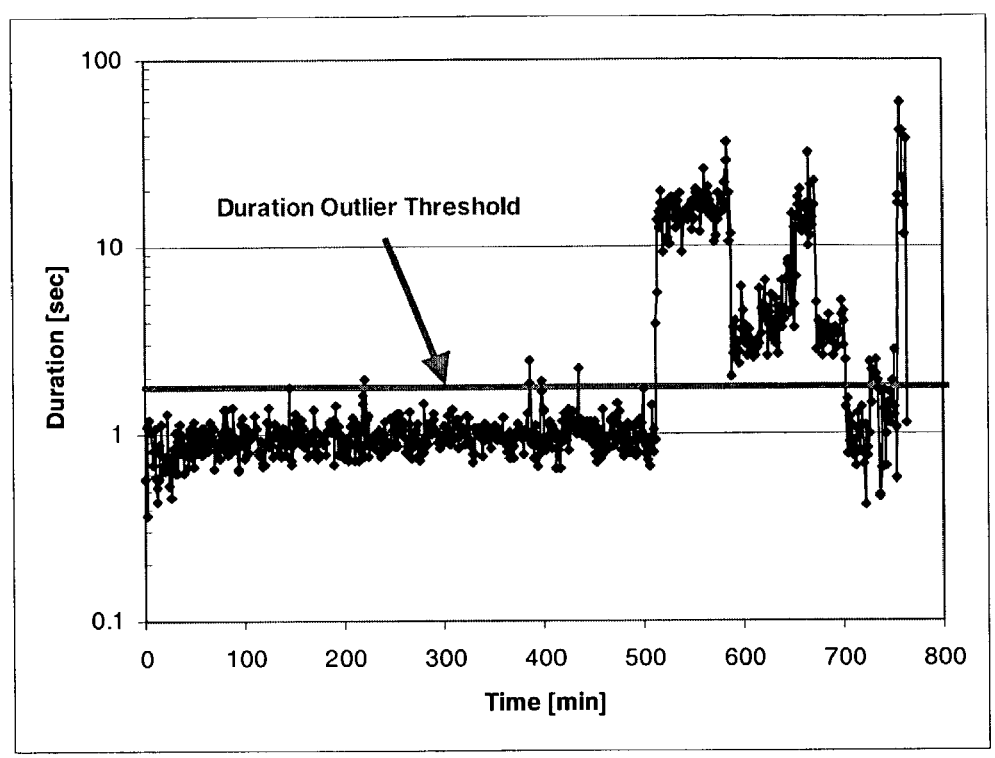
FIG. 7 is a plot illustrating an example of defining a threshold value for duration times for collected Internet data as part of a process for identifying duration outliers in accordance with an embodiment of the present invention.
Figure 8:
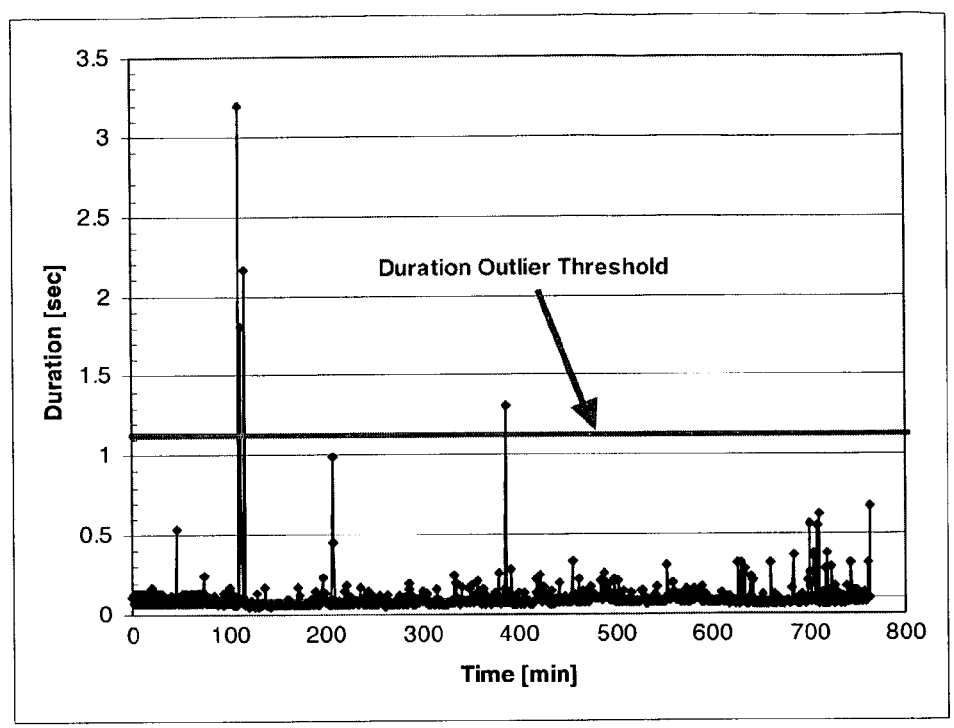
FIG. 8 is a plot illustrating another example of defining a threshold value for duration times for collected Internet data as part of a process for identifying duration outliers in accordance with an embodiment of the present invention.

At block 25, the remaining data points for each client type are binned or partitioned, according to median RTT value. Then, at block 26, the data points within each bin are sorted in order of ascending RTT and thresholds (e.g., at the 95th percentile or other selected point) are established for each bin. These per-bin thresholds now represent the baseline against which duration data can be evaluated to determine whether congestion exists. FIGS. 7 and 8 illustrate examples of duration thresholds set according to these procedures for different collections of Internet data. In these charts, duration is plotted as a function of connection time, measured from an arbitrary start point (i.e., the time at which data collection began).

For example, new (these duration thresholds should be applied to the current data used to determine the outliers and in principle, new data as well) duration data for one or more clients may be collected and averaged over the collection time intervals. Once the client(s) have been characterized by type (e.g., low or high RTT) and latency (RTT bin), the corresponding threshold value defining a duration outlier can be recalled (e.g., from a lookup table that was populated according to the results of the baseline determination procedure described above) and compared against the current duration data of interest. If the average duration for a client exceeds its corresponding threshold for a given time interval, then the client may be said to be experiencing congestion. If this behavior continues for successive time intervals, then the total time interval where the average duration exceeds the threshold value represents the length of a congestion episode.

Thus, a method for detecting congestion in Internet traffic has been described. However, although the above description included examples of threshold values and other presently preferred techniques, it should be remembered that the true scope of the invention should only be measured in terms of the claims, which now follow.

What is claimed is:

1. A method to detect congestion in a network traffic, comprising:
   for a first set of data points, each having a number of associated parameters, eliminating first outliers as determined according to first statistical properties of a first one of the associated parameters;
   establishing a first baseline based on remaining first set of data points without the first outliers; and
   examining a second set of data points against the first baseline for second outliers according to second statistical properties of a second one of the associated parameters.

2. The method of claim 1 wherein the first statistical properties are different than the second statistical properties.

3. The method of claim 1 wherein the second one of the associated parameters comprises end-to-end response time within a computer network.

4. The method of claim 1 wherein the second one of the associated parameters comprises end-to-end response time within an internetwork.

5. The method of claim 1 wherein the first one of the associated parameters affects the second one of the associated parameters.

6. A method to detect congestion in a network traffic, comprising:
   for a first set of data points, each having a number of associated parameters, eliminating first outliers as determined according to statistical properties of a first group of the associated parameters;
   establishing a first baseline based on remaining first set of data points without the first outliers; and
   examining a second set of data points against the first baseline for second outliers according to statistical properties of one of the associated parameters that is not included in the first group of associated parameters.

7. The method of claim 6 wherein the first group of the associated parameters includes file size, server response time, packet loss and latency.

8. The method of claim 7 wherein the one of the associated parameters that is not included in the first group of associated parameters comprises duration.

9. The method of claim 6 wherein outliers as determined according to statistical properties of a first group of the associated parameters are eliminated in part by sorting the first set of data points according to a first one of the first group of associated parameters and eliminating outliers as determined according to statistical properties of the first one of the first group of associated parameters.

10. A method to detect congestion in a network traffic, comprising
    collecting Internet traffic duration information for a client;
    characterizing the Internet traffic duration information by client type and latency;
    removing packet loss outliers for each client type;
    partitioning remaining data without packet loss outliers into bins;
    setting latency threshold values for the bins; and
    examining the Internet traffic duration information for duration outliers as determined by the latency threshold values.

11. A method to detect congestion in a network traffic, comprising:
    establishing a baseline for internet traffic duration by (i) collecting internet traffic data regarding file size, server response time, packet loss and round trip time, (ii) removing from this data outliers associated with file size, server response time and packet loss per client type, and (iii) organizing any remaining data into round trip time bins according to median values of round trip time per client type; and
    comparing historical or newly collected Internet traffic data against threshold values for each round trip time bin to locate duration outliers.

12. The method of claim 11 wherein outliers associated with file size are removed by sorting all file size measurements in ascending order and eliminating any of the data associated with file size measurements that exceed a file size threshold value.

13. The method of claim 12 wherein the file size threshold value represents a $95^{th}$ percentile for the file size measurements.

14. The method of claim 11 wherein outliers associated with file size are removed by first categorizing all file size measurements into distinct file size ranges and, for each category of file size ranges, sorting file size measurements in ascending order and eliminating any of the data associated with file size measurements that exceed a file size threshold value.

15. The method of claim 11 wherein outliers associated with server response time are removed by sorting all server response time measurements in ascending order and eliminating any of the data associated with server response time measurements that exceed a server response time threshold value.

16. The method of claim 15 wherein the server response time threshold value represents a $95^{th}$ percentile for the server response time measurements.

17. The method of claim 11 wherein outliers associated with packet loss are removed by categorizing all packet loss measurements by client type and then, for each client type, sorting packet loss measurements in ascending order and eliminating any of the data associated with packet loss measurements that exceed a packet loss threshold value.

18. The method of claim 17 wherein the client type is either low or high RTT.

19. The method of claim 18 wherein the packet loss threshold value represents a $95^{th}$ percentile for packet loss measurements per client type.

20. The method of claim 11 wherein the round trip time bins are established according to median round trip time per client type.

21. The method of claim 20 wherein the client type is either low or high RTT.

* * * * *